United States Patent [19]

Comiskey

[11] Patent Number: 6,089,169
[45] Date of Patent: Jul. 18, 2000

[54] CONVERSION OF WASTE PRODUCTS

[75] Inventor: Eugene A. Comiskey, McMullen County, Tex.

[73] Assignee: C.W. Processes, Inc., Corpus Christi, Tex.

[21] Appl. No.: 09/274,266

[22] Filed: Mar. 22, 1999

[51] Int. Cl.$^7$ ............................... F23B 7/00; F23B 5/02; F23N 5/00

[52] U.S. Cl. ..................... 110/233; 110/347; 110/185; 110/187; 110/205

[58] Field of Search ..................... 110/233, 185, 110/186, 187, 188, 203, 205, 210, 211, 212, 341, 344; 422/168, 169, 170, 171, 173, 174; 198/187, 188; 432/58, 16, 105

[56] References Cited

U.S. PATENT DOCUMENTS

| | | |
|---|---|---|
| 4,729,891 | 3/1988 | Kulkarni . |
| 4,896,614 | 1/1990 | Kulkarni ................................. 110/346 |
| 5,005,494 | 4/1991 | Schlienger ............................. 110/341 |
| 5,010,829 | 4/1991 | Kulkarni . |
| 5,138,959 | 8/1992 | Kulkarni . |
| 5,372,077 | 12/1994 | Yen et al. ............................... 110/233 |
| 5,402,739 | 4/1995 | Abboud et al. ........................ 110/346 |
| 5,534,659 | 7/1996 | Springer et al. ....................... 588/227 |
| 5,541,386 | 7/1996 | Alvi . |
| 5,634,414 | 6/1997 | Camacho ............................... 110/346 |
| 5,656,044 | 8/1997 | Bishop et al. ........................ 48/197 R |
| 5,662,050 | 9/1997 | Angelo . |
| 5,762,009 | 6/1998 | Garrison et al. ...................... 110/346 |
| 5,767,165 | 6/1998 | Steinberg et al. ..................... 518/703 |
| 5,827,012 | 10/1998 | Circeo .................................... 405/131 |
| 5,906,806 | 5/1999 | Clark .................................. 433/437.1 |
| 5,964,085 | 10/1999 | Newby ................................. 60/39.02 |
| 5,980,610 | 11/1999 | Huang et al. ............................. 95/58 |

OTHER PUBLICATIONS

Superheated plasma could solve nation's hazardous, toxic waste disposal problems, The Corpus Christi Caller Times, Apr. 22, 1995 pA4.

Inductive Plasma Torch for Environmental recycling, a publication of Los Alamos National Laboratory, LALP–95–17, two pages.

Plasma Technology Used to Destroy Asbestos, U.S. Army Corps of Engineers, one page.

Plasma Torch Demonstrates Underground Classification at SRS, Westinghouse Savannah River Company, two pages.

Asbestos Abatement/Destruction Using Plasma Arc Technology, U.S. Army Corps of Engineers, two pages, Feb. 1998.

Vitrification, Electro–Pyrolysis, Inc, Wayne, Pa. four pages.

Plasma Afterburner for Treatment of Effluents from SOlid Waste Processing, Defense Sciences Engineering Division, six pages.

Plasma Arc Destruction of Hazardous Wastes, Naval Research Labobratory, one page.

Plasma Arc Torch Technology, Construction Industry Intsitute Fact Sheet, four pages.

*Primary Examiner*—Denise L. Ferensic
*Assistant Examiner*—K. B. Rinehart
*Attorney, Agent, or Firm*—G. Turner Moller

[57] ABSTRACT

A facility for reclaiming useful products from solid municipal and hazardous waste uses a rotary kiln to convert the material into a stream of inorganic ash and a stream of gaseous combustion products. The stream of combustion products passes in heat exchange relation to unburned waste and produces a stream of volatile carbon compounds which are deficient in oxygen. The streams of combustion products and volatile carbon compounds are converted in a plasma arc generator into a stream of hot, disassociated atoms. The stream of hot gas is cooled by passage through one or more heat exchangers that reclaim process heat. The stable compounds that are produced are hydrogen and carbon monoxide. The process is controlled by monitoring carbon dioxide in the carbon monoxide stream. The carbon monoxide and hydrogen may be used separately or combined, as in a methanol synthesis plant.

41 Claims, 1 Drawing Sheet

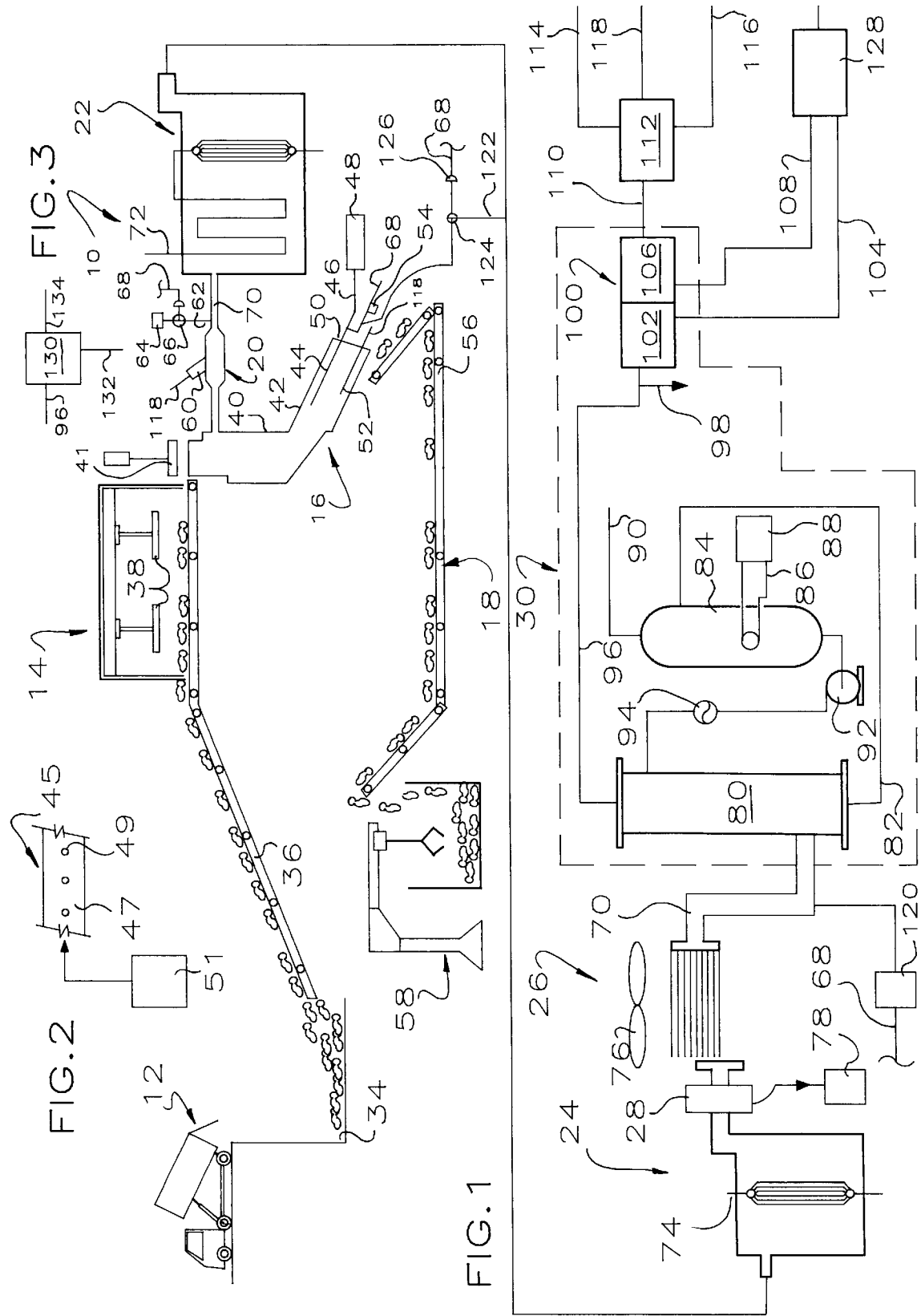

CONVERSION OF WASTE PRODUCTS

This invention is a technique for converting waste products into useful materials, particularly by the use of a plasma generator that converts complex molecules into atoms.

BACKGROUND OF THE INVENTION

There have been many proposals to convert waste products into useful materials. One category of these proposals has been to subject the waste products to plasma arcs to convert the complex molecules into atoms. Exemplary disclosures of this type technique are found in U.S. Pat. Nos. 4,602,991; 4,729,891; 4,896,614; 5,005,494; 5,010,829; 5,138,959; 5,534,659; 5,541,386; 5,662,050 and The Corpus Christi Caller Times, Apr. 22, 1995, p A4; and a series of articles entitled Inductive Plasma Torch for Environmental Recycling; Plasma Technology Used to Destroy Asbestos; Plasma Torch Demonstrates Underground Glassification at SRS; Asbestos Abatement/Destruction Using Plasma Arc Technology; Vitrification; Plasma Afterburner for Treatment of Effluents from Solid Waste Processing; Plasma Arc Destruction of Hazardous Wastes and Plasma Arc Torch Technology.

SUMMARY OF THE INVENTION

In this invention, municipal solid waste, hazardous waste, industrial waste and the like is delivered into an inlet structure. The material is conveyed through a metal removing facility and then conveyed into a hopper delivering the material to a combuster or kiln which incorporates a burner capable of operation as a starved air burner. The hopper is arranged to minimize or control air passing into the hopper and the combuster. Hot inorganic ash and non-recoverable metals come out the bottom of the kiln and are conveyed to a recycle facility. Gases, which are mainly organic, are driven off the solid material in the combuster before reaching the burner and pass unburned into the inlet of a plasma generator. Combustion products from the burner mix with the unburned gases and also pass into the inlet of the plasma generator. The input gases are stoichiometrically deficient in oxygen, i.e. there is sufficient oxygen to produce a substantial quantity of carbon monoxide but insufficient oxygen to produce a substantial quantity of carbon dioxide. In the plasma generator, a hot stream of inert gas heats the gas molecules to such a high temperature that the molecules disassociate into their constituent atoms.

Process heat is recovered from the hot stream of atoms leaving the plasma generator and the temperature of the stream of atoms is lowered to a point where some of the atoms begin to recombine. A series of operations separate the recombined molecules into materials of value. Sulfur may be recovered by any suitable technique, depending on the amount of sulfur anticipated in the inlet stream. Further downstream, an amine scrubber removes hydrogen sulfide and carbon dioxide from the gas stream leaving a stream mainly comprising hydrogen, carbon monoxide and an inert gas. In one embodiment, a molecular sieve or other suitable apparatus is used to separate inert gas from hydrogen and carbon monoxide thereby providing separate streams of inert gas, hydrogen and carbon monoxide. The inert gas is returned to the plasma arc generator and reused. In another embodiment, the inert gas, hydrogen and carbon monoxide are delivered to a methanol reactor and converted to methanol and the inert gas.

An important part of this invention is determining whether too much or too little oxygen is present in the outlet stream and adjusting the process accordingly. In a preferred embodiment, an analyzer or sensor in the carbon monoxide stream detects the presence and concentration of carbon dioxide or other suitable oxygen rich material. A feedback loop introduces water or steam into the stream of hot gas when the concentration of carbon dioxide is too low, e.g. below 100 ppm. In the event the analyzer detects too much carbon dioxide, e.g. 5% or preferably 1% or less, the sensor reduces the delivery of steam or water into the stream of hot gas. When no water or steam is being delivered, the sensor diverts some of the gas exiting from the plasma generator back to the starved air burner. This acts to burn some of the elemental oxygen in the outlet gas, in lieu of introduced air, thereby reducing the amount of oxygen in the product stream.

The carbon monoxide and hydrogen are used in any one of a variety of recovery operations such as providing feedstock for a methanol synthesis plant. A mass balance for carbon shows that 200 tons/day of municipal solid waste, at 25% carbon by weight, can be converted into 40,000 gallons/day of methanol. Most municipal wastes are considerably greater than 25% carbon by weight.

It is an object of this invention to provide an improved technique for converting municipal and hazardous waste into useful products.

A further object of this invention is to provide an improved technique for converting municipal and hazardous waste into inorganic ash and metals, a stream of carbon monoxide and a stream of hydrogen.

These and other objects and advantages of this invention will become more apparent as this description proceeds, reference being made to the accompanying drawings and appended claims.

BRIEF DESCRIPTION OF THE DRAWINGS

FIG. 1 is a partly pictorial, partly schematic view of a treatment facility of this invention;

FIG. 2 is a segment of an inert gas seal; and

FIG. 3 is a partial view of another embodiment of this invention.

DETAILED DESCRIPTION

Referring to FIGS. 1–2, there is illustrated a facility 10 for receiving waste material, such as municipal waste, hazardous waste, industrial waste and the like and converting it into carbon monoxide and hydrogen. The waste material has a sizeable proportion of carbon. Typical organic materials are rich in carbon and hydrogen. Analysis of a typical municipal waste shows that the proportion of carbon, by weight, exceeds 25%. The carbon monoxide and hydrogen may be used separately or recombined, as in a methanol synthesis plant.

The waste material treatment facility 10 of FIG. 1 comprises, as major components, an inlet structure 12, a metal reclaiming facility 14, a combustion facility 16, an inorganic ash recycling facility 18, a plasma arc generator 20 for producing a gaseous stream of atoms, a series of heat exchangers 22, 24, 26 for removing and reclaiming process heat, a sulfur recovery facility 28 and a facility 30 for separating carbon monoxide, hydrogen and an inert gas from the gas stream. A substantial amount of process control is provided by adding an oxygen rich material into the stream in response to a low value of carbon dioxide in the output stream and by reducing the oxygen rich material being added to the system in response to a high value of carbon dioxide in the output stream. In the event too much carbon dioxide is detected when no oxygen rich material is being added to the system, part of the gas downstream from the plasma generator 20 is diverted to the combustion facility 16 to support combustion in the facility 16 by using some of the oxygen in the outlet stream in lieu of using air added to the system.

The inlet structure 12 is of conventional type and includes a dump site or pit 34 where solid municipal or hazardous waste material may be dumped. A conveyor 36 transports the material through the metal reclaiming facility 14 adjacent one or more magnetic reclaimers 38 which act to remove magnetic materials from the stream of solid wastes. The reclaimers 38 may be of any suitable type such as an eddy current separator made by Industrial Magnetics, Inc. of Boyne City, Mich.

After passing through the metal reclaiming facility, the conveyor 36 dumps into a feed hopper 40. The hopper 40 is equipped to minimize or control air entry into the system, at least during operation. This may be accomplished in a very simple manner by batch operation in which the hopper 40 is filled with product to be treated and a lid or closure 41 is moved by a hydraulic motor 43 or other suitable operator to seal against the entry opening into the hopper 40.

A more elegant solution is to provide an inert gas molecular seal 45 around the entry to the hopper 40. These systems provide a nitrogen or other inert gas curtain around the hopper inlet and thereby allow continuous delivery of product through the hopper 11 inlet while minimizing or controlling the amount of oxygen entering the hopper 40 through the inlet. To this end, a typical inert gas seal 45 is shown in FIG. 2 where a tubular flange 47 around the inlet to the hopper 40 provides a series of outlet openings 49. Inert gas, such as nitrogen, from a source 51 is delivered into the flange 47 so the inert gas passes into the hopper 40 rather than air from the atmosphere.

The hopper 40 which discharges into a combuster of any suitable type. Preferably, the combuster is a rotary kiln 42 where a starved air burner 44 is fed through a conduit 46 from a fuel source 48. Starved air burners are well known in the art and typical commercial devices are made by NAO, Inc., Philadelphia, Pa. The conduit 46 extends through a stationary end 50 of the rotary kiln 42 in a conventional manner. A conventional plasma gun 52 also extends through the end 50 of the rotary kiln 42 and discharges a hot stream of inert gas, preferably nitrogen. Air to the starved air burner 44 is controlled through an air control assembly 54 in a conventional manner so the burner 44 is capable of operation at less than a stoichiometric amount of oxygen for purposes more fully apparent hereinafter.

Waste material in the rotary kiln 42 accordingly burns, producing a solid component exiting from the bottom of the kiln 42 onto a conveyor 56 leading to a recycling facility 58. The solid component exiting from the kiln 42 is mainly inorganic ash but includes a small fraction of some nonmagnetic metals of which aluminum is the most common. The ash from the treatment facility 58 is useful as a road building component in the same manner as fly ash from cement kilns.

Combustion gases produced in the rotary kiln 42 pass upwardly through the hopper 40 and act to heat the incoming solid waste stream. Volatile compounds in the solid waste are vaporized and pass, along with the combustion products, into the plasma arc generator 20 where one or more plasma guns 60 deliver a very hot plasma arc comprising a hot stream of inert gas atoms. Because the volatile gases driven off the waste in the hopper are not burned, there is a stoichiometrically deficient amount of oxygen in the gaseous material leaving the hopper 40. Because of its low cost and because it is recovered at the end of the facility 10, nitrogen is the preferred inert gas used in this invention. Temperatures in, and immediately downstream of, the plasma arc generator 20 are sufficient to convert all of the gaseous molecules into their constituent atoms. This temperature is in the neighborhood of 800–200° F. depending on the residence time in the plasma generator 20.

An important feature of this invention lies in the arrangement wherein hot combustion products from the rotary combuster 42 act to vaporize volatile constituents in the hopper 40. It is important that the stream of gaseous atoms leaving the plasma arc generator 20 be stoichiometrically deficient in oxygen because the desired products exiting from the facility 10 are carbon monoxide and hydrogen. If there were a stoichiometrically amount of oxygen present, one would necessarily get carbon dioxide and water from the outlet of this invention. To this end, the hot combustion products from the rotary combuster 42 drive off volatile compounds from the waste material in the hopper 40. Although the hot combustion products may be, or close to, a stoichiometric mixture of carbon, oxygen and hydrogen, the oxygen deficient volatiles from the hopper 40 allow the atoms to be recombined as carbon monoxide and hydrogen rather than carbon dioxide and water. In addition, the starved air burner 44 allows the combustion process in the combuster 42 to occur with a deficiency of oxygen.

For purposes more fully apparent hereinafter, a conduit 62 leads to a source 64 of oxygen rich material such as $H_2O$ in the form of water or steam. Flow through the conduit 62 is controlled by a valve 66 which is in turn controlled by an electrical signal on a wire 68.

The hot gaseous stream of atoms emitting from the plasma arc generator 20 passes through a series of heat exchangers 22, 24, 26 which remove heat from the gaseous stream and thereby lower the temperature of the gas in the conduit 70. The heat exchanger or primary boiler 22 accordingly produces high pressure, superheated steam in an outlet conduit 72 while the heat exchanger or boiler 24 produces low pressure steam in an outlet conduit 74. The heat exchanger 26 may be air cooled and accordingly includes a powered fan 76. As the temperature in the conduit 70 falls in response to the operation of the heat exchangers 22, 24, 26, the atoms in the gas stream begin to recombine, according to their physical chemistry characteristics and the elements present in the stream of hot atoms in the conduit 70. The thermodynamics of the process of recombining preferentially produce carbon monoxide and hydrogen, provided the oxygen content and other variables are controlled, rather than carbon dioxide or elemental carbon. In this invention, oxygen is added or eliminated from the stream of hot atoms in order to control the process so the end products are carbon monoxide and hydrogen.

Sulfur compounds are among the first to recombine, either as elemental sulfur, as sulfur-oxygen compounds or sulfur-hydrogen compounds. If the amount of sulfur compounds justifies the cost, the sulfur recovery facility 28 is positioned along the conduit 70 at a location, adjacent the heat exchangers 24, 26, where a temperature is reached where the sulfur compounds become stable. The type and size of the sulfur recovery facility 28 depends on the expected amount of sulfur in the inlet stream. If the anticipated amount of sulfur is fairly low, as expected in conventional municipal waste, an iron filing technique may be used to react sulfur with elemental iron to produce iron sulfide. This may be accomplished by circulating iron pellets between a compartment in the conduit 70 and a recovery compartment 78. Larger expected concentrations of sulfur may be handled by techniques, known in the art, used to remove sulfur from crude oil in refineries.

Downstream of the cooler 26, the conduit 70 connects to the facility 30 where the inert gas, carbon monoxide and hydrogen are separated. The facility 30 includes a contactor 80 in which one of the carbon dioxide solvents, such as one of the liquid amines, preferably monoethanolamine, is circulated. Typically, a liquid amine-carbon dioxide solution passes out of the bottom of the contactor 80 through a conduit 82 to a boiler 84 which is preferably heated by low pressure steam circulating through a coil (not shown) fed through conduits 86 leading to a source of steam 88, such as the heat exchanger 24. In the boiler 84, carbon dioxide and any hydrogen sulfide, in the absence of the sulfur recovery unit 28, are boiled off the liquid amine and exit through a conduit 90 in the top of the boiler 84. Hot liquid amine passes through a pump 92 and control valve 94 into the top of the contactor 80. The gas passing through the contactor 80 and exiting through the outlet conduit 96 is not absorbed by the amine solvent and is accordingly mainly carbon monoxide, hydrogen and nitrogen which was introduced into the system as air for the burner 44 and as inert gas for the plasma guns 52, 60.

The carbon monoxide, hydrogen and inert gas are separated in any suitable manner, as by the use of a molecular sieve 100. The molecular sieve 100 is a two stage arrangement in which a first stage 102 separates the smallest molecules, i.e. hydrogen, from the gas stream and delivers them to an outlet 104 for purposes more fully explained hereinafter. The gas stream flowing into the second stage 106 contains nitrogen and carbon monoxide which is separated into a carbon monoxide stream exiting through an outlet 108 and a nitrogen outlet 110.

A minor amount of chlorine may be present in the conduit 96. As the temperature in the conduit 96 falls due to heat loss to the atmosphere, some hydrogen chloride may be formed which is removed through a drip 98. If the amount of chlorine is of economically significant size, the chlorine may be reclaimed. If chlorine is present in a nuisance amount, it is removed in any suitable manner. One suitable technique is to provide a vessel 112 connected to the conduit 110. Sodium hydroxide is introduced through a conduit 114 to produce sodium chloride which is taken off through a conduit 116. Accordingly, nitrogen is delivered through the output conduit 118 and recycled to the plasma guns 52, 60.

As mentioned previously, an important part of this invention is adjusting the process to produce mostly carbon monoxide, rather than carbon dioxide. Communicating with the conduit 70 downstream of the sulfur recovery unit 28 and upstream of the contactor 80 is a sensor or analyzer 120 for determining the amount of oxygen in the gaseous output stream. If the correct amount of oxygen is in the gaseous output stream, the gas will be mainly carbon monoxide. If there is too little oxygen, a considerable amount of elemental carbon or carbon black will be present which will ultimately plug up equipment downstream from the plasma generator 20. If there is too much oxygen in the system, too much carbon dioxide will be produced which has essentially no value. Preferably, this is done by monitoring the concentration of an oxygen rich gas in the conduit 90 which is ideally carbon dioxide.

If the carbon dioxide level is below a predetermined level, such as a few thousand parts per million, or preferably a few hundred parts per million, such as 500 parts per million, there is a danger of forming elemental carbon and thus a danger of plugging the equipment. In response to a low carbon dioxide signal from the sensor 120, an oxygen rich material is added to the conduit 70 immediately downstream from the plasma generator 20. The oxygen rich material is preferably $H_2O$ in the form of water or steam because it is of low cost, is easy to handle and includes hydrogen which is a desired product of the treatment facility 10. Thus, a signal on the control wire 68 opens the valve 66 and delivers water into the conduit 70. The addition of water or steam to the conduit 70 accordingly raises the oxygen level in the system and prevents the accumulation of elemental carbon in the equipment.

If the carbon dioxide level is too high, such as 5% or preferably considerably less, such as 1%, there is too much oxygen in the system. In response to too much carbon dioxide in the system, any water or steam being injected through the conduit 62 is reduced or eliminated by an appropriate signal on the control wire 68. If there is no water or steam being injected into the conduit 70, the oxygen in the system is reduced by other means. One technique is to reduce the amount of air delivered to the starved air burner 44 in proportion to the amount of fuel by controlling the air intake assembly 54 in response to a signal on the control wire 68 from the analyzer 120. Thus, the ratio of air to fuel delivered to the burner 44 is decreased when the analyzer 120 senses an excess of carbon dioxide in the conduit 90. Thus, the starved air burner 44 may operate at substantially less than stoichiometric oxygen when too much carbon dioxide appears in the conduit 90.

Another technique to reduce oxygen in the system is to provide a bypass conduit 122 which is partially opened by manipulating a valve 124, as by the use of a controller 126 connected to the control wire 68. The bypass conduit 122 acts to recycle gas from the conduit to the starved air burner 44. By recycling some of the gas in the conduit 70 into the burner 44, some of the oxygen in the stream reacts with fuel from the source 48 in lieu of admitted air thereby reducing the oxygen level in the output stream.

It will be apparent that other techniques may be used to determine whether mostly carbon monoxide is being produced. In one alternative, the ratio of carbon dioxide to carbon monoxide may be determined. In another alternative, a sensor (not shown) may be provided to determine the amount of oxygen and the amount of carbon downstream of the plasma generator, calculating the proportion of carbon monoxide and carbon dioxide and then making process adjustments accordingly.

The hydrogen in the conduit 104 and the carbon monoxide in the conduit 108 can be commingled in a methanol synthesis plant 128, commingled and burned as so-called water gas or used separately.

A mass balance for carbon shows that 200 tons/day of municipal solid waste, at 25% carbon by weight, can be converted into 40,000 gallons/per day of methanol. Because most municipal waste has a higher proportion of carbon, potential methanol production is proportionately greater. An energy balance is not possible without knowing more about the average composition of the input waste material and the deviation of actual compositions from the average. Energy balances on sample compositions thought to be representative of municipal waste suggest the energy in the methanol output is roughly ten times the energy necessary to run the process. Thus, 10% of the methanol or 10% of the feedstock could be diverted, burned to generate electricity and used to operate the plasma arc jets. Allowing for thermodynamic inefficiencies and heat losses, the 10% energy cost is likely closer to 30%. Nevertheless, the entire process results in a substantial gain.

Referring to FIG. 3, another embodiment of this invention is illustrated. Rather than separate the inert gas, hydrogen and carbon dioxide into their component streams, it may be desirable to react the entire stream in the conduit 96 in a methanol reactor 130 to deliver methanol through an outlet 132 and a stream comprising mainly the inert gas through an outlet 134.

Although this invention has been disclosed and described in its preferred forms with a certain degree of particularity, it is understood that the present disclosure of the preferred forms is only by way of example and that numerous changes in the details of operation and in the combination and arrangement of parts may be resorted to without departing from the spirit and scope of the invention as hereinafter claimed.

I claim:

1. Apparatus for converting products containing a sizeable proportion of organic material into carbon monoxide and hydrogen, comprising
   means for generating a feedstock stream including means controlling the amount of oxygen in the feedstock stream to a value sufficient to produce a substantial proportion of carbon monoxide and less than that stoichiometrically required to produce a substantial proportion of carbon dioxide, the generating means comprising a starved air burner receiving and combusting the products and generating a gaseous feedstock stream and means for controlling the amount of air delivered to the starved air burner;
   a plasma arc generator receiving the feedstock stream for converting the feedstock stream into a stream of hot atoms stoichiometrically deficient in oxygen;
   means for cooling the stream of hot atoms to a temperature where the atoms recombine into a molecular stream of carbon monoxide, carbon dioxide, hydrogen and an inert gas;
   means for converting the carbon monoxide, carbon dioxide, and hydrogen and inert gas into a useful product;
   an analyzer for determining the amount of oxygen downstream of the plasma arc generator; and
   means responsive to the analyzer for altering the oxygen concentration in the molecular stream to produce carbon monoxide in preference to carbon dioxide, including means for manipulating the controlling means for reducing the amount of air delivered to the starved air burner when the oxygen concentration rises above a predetermined value.

2. The apparatus of claim 1 wherein the means responsive to the analyzer comprises means for delivering at least part of the stream of hot atoms to the starved air burner when the oxygen concentration rises above a predetermined value.

3. The apparatus of claim 1 further comprising means placing the gaseous feedstock stream in heat exchange relation with incoming products for vaporizing volatile carbon compounds from the incoming products prior to combustion in the starved air burner.

4. The apparatus of claim 3 wherein the placing means comprises means commingling the gaseous feedstock stream with the incoming products.

5. The apparatus of claim 1 further comprising a metal removing facility upstream of the starved air burner.

6. The apparatus of claim 1 wherein the means responsive to the analyzer comprises means for introducing an oxygen rich material into the apparatus when the concentration of oxygen falls below a predetermined value.

7. The apparatus of claim 6 wherein the means for introducing an oxygen rich material comprises means for delivering $H_2O$ into the apparatus.

8. The apparatus of claim 7 wherein the means for introducing an oxygen rich material comprises means for delivering the oxygen rich material into the stream of hot atoms.

9. The apparatus of claim 1 further comprising a hopper having an inlet for receiving the products and the means for controlling the amount of oxygen includes means controlling air entry into the hopper.

10. The apparatus of claim 9 wherein the means for controlling air entry into the hopper includes a lid for the hopper inlet.

11. The apparatus of claim 9 wherein the means for controlling air entry into the hopper includes means for creating an inert gas curtain adjacent the hopper inlet.

12. The apparatus of claim 1 wherein the converting means comprises a separation facility receiving the molecular stream and having a first outlet delivering a first outlet stream rich in carbon monoxide, a second outlet delivering a second outlet stream comprising an inert gas and a third outlet delivering a third outlet stream comprising hydrogen.

13. The apparatus of claim 12 wherein the plasma arc generator is an inert gas plasma arc generator and further comprising means for delivering inert gas from the separation facility to the plasma arc generator.

14. The apparatus of claim 12 further comprising a recombination facility for recombining the hydrogen and the carbon monoxide into a useful product.

15. A The apparatus of claim 14 wherein the recombination facility comprises a methanol synthesis plant.

16. The apparatus of claim 1 wherein the converting means comprises a methanol reactor having an inlet receiving the molecular stream, a methanol outlet and an outlet having a stream of other products.

17. The apparatus of claim 1 wherein the analyzer determines the amount of carbon dioxide downstream of the plasma arc generator.

18. Apparatus for converting products containing a sizeable proportion of organic material into a useful product, comprising
   means for generating a feedstock stream including means controlling the amount of oxygen in the feedstock stream to a value sufficient to produce a substantial proportion of carbon monoxide and less than that stoichiometrically required to produce a substantial proportion of carbon dioxide, the generating means comprising a starved air burner receiving and combusting the products and generating a gaseous feedstock stream and means for controlling the amount of air delivered to the starved air burner;
   a plasma arc generator receiving the feedstock stream for converting the feedstock stream into a stream of hot atoms stoichiometrically deficient in oxygen;
   means for cooling the stream of hot atoms to a temperature where the atoms recombine into a molecular stream of carbon monoxide, carbon dioxide, hydrogen and an inert gas;
   means for converting the carbon monoxide, carbon dioxide and into a useful product;
   an analyzer for determining the amount of oxygen downstream of the plasma arc generator; and means responsive to the analyzer for altering the oxygen concentration in the molecular stream to produce carbon monoxide in preference to carbon dioxide, including means for manipulating the controlling means for increasing the ratio of air to fuel delivered to the starved air burner when the oxygen concentration falls below a predetermined value.

19. The apparatus of claim 18 wherein the means responsive to the analyzer comprises means for introducing an oxygen rich material into the apparatus when the concentration of oxygen falls below a predetermined value.

20. Apparatus for converting products containing a sizeable proportion of organic material into carbon monoxide and hydrogen, comprising a hopper having an inlet for receiving the products;

means downstream of the hopper for generating a feedstock stream including means controlling the amount of oxygen in the feedstock stream to a value sufficient to produce a substantial proportion of carbon monoxide and less than that stoichiometrically required to produce a substantial proportion of carbon dioxide, the means for controlling the amount of oxygen including means controlling air entry into the hopper comprising means for creating an inert gas curtain adjacent the hopper inlet;

a plasma arc generator receiving the feedstock stream for converting the feedstock stream into a stream of hot atoms stoichiometrically deficient in oxygen;

means for cooling the stream of hot atoms to a temperature where the atoms recombine into a molecular stream of carbon monoxide, carbon dioxide, hydrogen and an inert gas;

means for converting the carbon monoxide, carbon dioxide and hydrogen into a useful product;

an analyzer for determining the amount of oxygen downstream of the plasma arc generator; and means responsive to the analyzer for altering the oxygen concentration in the molecular stream to produce carbon monoxide in preference to carbon dioxide.

21. Apparatus for converting products containing a sizeable proportion of organic material into carbon monoxide and hydrogen, comprising means for generating a feedstock stream including means controlling the amount of oxygen in the feedstock stream to a value sufficient to produce a substantial proportion of carbon monoxide and less than that stoichiometrically required to produce a substantial proportion of carbon dioxide;

an inert gas plasma arc generator receiving the feedstock stream for converting the feedstock stream into a stream of hot atoms stoichiometrically deficient in oxygen;

means for cooling the stream of hot atoms to a temperature where the atoms recombine into a molecular stream of carbon monoxide, carbon dioxide, hydrogen and an inert gas;

means for converting the carbon monoxide, carbon dioxide, hydrogen and inert gas into a useful product comprising a separation facility receiving the molecular stream and having a first outlet delivering a first outlet stream rich in carbon monoxide, a second outlet delivering a second outlet stream comprising an inert gas and a third outlet delivering a third outlet stream comprising hydrogen;

means for delivering inert gas from the separation facility to the plasma arc generator;

an analyzer for determining the amount of oxygen downstream of the plasma arc generator; and means responsive to the analyzer for altering the oxygen concentration in the molecular stream to produce carbon monoxide in preference to carbon dioxide.

22. Apparatus for converting products containing a sizeable proportion of organic material into a useful product, comprising means for generating a feedstock stream including means controlling the amount of oxygen in the feedstock stream to a value sufficient to produce a substantial proportion of carbon monoxide and less than that stoichiometrically required to produce a substantial proportion of carbon dioxide;

a plasma arc generator receiving the feedstock stream for converting the feedstock stream into a stream of hot atoms stoichiometrically deficient in oxygen;

means for cooling the stream of hot atoms to a temperature where the atoms recombine into a molecular stream of carbon monoxide, carbon dioxide, hydrogen and an inert gas;

means for converting the carbon monoxide, carbon dioxide, hydrogen and inert gas into a useful product comprising a methanol reactor having an inlet receiving the molecular stream, a methanol outlet and an outlet having a stream of other products;

an analyzer for determining the amount of oxygen downstream of the plasma arc generator; and means responsive to the analyzer for altering the oxygen concentration in the molecular stream to produce carbon monoxide in preference to carbon dioxide.

23. The apparatus of the claim 1 wherein the analyzer comprises means for analyzing for carbon dioxide and thereby analyzing for oxygen.

24. A method of converting products containing a sizeable proportion of organic material into carbon monoxide and hydrogen, comprising creating a feedstock stream having therein oxygen in a amount sufficient to produce a substantial proportion of carbon monoxide and less than that stoichiometrically required to produce a substantial proportion of carbon dioxide;

delivering the feedstock stream to a plasma arc generator and converting the feedstock stream into a stream of hot atoms;

cooling the stream of hot atoms to a temperature where the atoms recombine into a molecular stream of carbon monoxide, carbon dioxide, hydrogen and an inert gas;

converting the molecular stream into a useful product comprising separating the molecular stream into a first outlet stream rich in carbon monoxide, a second outlet stream comprising an inert gas and a third outlet stream comprising hydrogen;

analyzing the material downstream of the plasma generator and determining the amount of oxygen therein; and adjusting the oxygen concentration in the molecular stream in response to the concentration of oxygen.

25. The method of claim 24 wherein the creating step comprises burning the products in a combuster and forming a gaseous feed-stock stream.

26. The method of claim 25 wherein the gaseous feedstock stream is in heat exchange relation with incoming products thereby vaporizing volatile carbon compounds from the products before entering the combuster.

27. The method of claim 25 wherein the gaseous feedstock stream is in direct heat exchange relation with the incoming products.

28. The method of claim 25 wherein the combuster includes a starved air burner and the adjusting step comprises reducing the amount of air delivered to the starved air burner when the carbon dioxide concentration rises above a predetermined value.

29. The method of claim 25 wherein the combuster includes a starved air burner and the adjusting step comprises increasing the ratio of air to fuel delivered to the starved air burner when the oxygen concentration falls below a predetermined value.

30. The method of claim 25 wherein the burning step is conducted under conditions to produce a gaseous feedstock stream having a stoichiometric deficiency of oxygen.

31. The method of claim 24 wherein the adjusting step comprises adding an oxygen rich material when the concentration of oxygen falls below a predetermined value.

32. The method of claim 31 wherein the oxygen rich material is $H_2O$.

33. The method of claim 32 wherein the oxygen rich material is delivered into the stream of hot atoms.

34. The method of claim 24 wherein the adjusting step comprises delivering at least part of the stream of hot atoms to the combuster when the concentration of oxygen rises above a predetermined value.

35. The method of claim 24 wherein the analyzing step comprises determining the concentration of carbon dioxide in the molecular stream.

36. A method of converting products containing a sizeable proportion of organic material into carbon monoxide and hydrogen, comprising
    creating a feedstock stream having therein oxygen in a amount sufficient to produce a substantial proportion of carbon monoxide and less than that stoichiometrically required to produce a substantial proportion of carbon dioxide, including
        passing the products into an inlet structure;
        burning the products in a combuster and forming a gaseous feedstock stream;
        passing the gaseous feedstock stream in heat exchange relation with incoming products thereby vaporizing volatile carbon compounds from the products before the products enter the combuster; and
        commingling the volatile carbon compounds and the gaseous feedstock stream in a commingled stream having a stoichiometric deficiency of oxygen;
    delivering the commingled stream to a plasma arc generator and converting the commingled stream into a stream of hot atoms;
    cooling the stream of hot atoms to a temperature where the atoms recombine into a molecular stream of carbon monoxide, carbon dioxide, hydrogen and an inert gas; and
    converting the molecular stream into a useful product comprising separating the molecular stream into a first outlet stream rich in carbon monoxide, a second outlet stream comprising an inert gas and a third outlet stream comprising hydrogen.

37. The method of claim 36 wherein the passing step comprises passing the gaseous feedstock stream in direct heat exchange with the incoming products.

38. A method of converting products containing a sizeable proportion of organic material into carbon monoxide and hydrogen, comprising
    creating a feedstock stream having therein oxygen in a amount sufficient to produce a substantial proportion of carbon monoxide and less than that stoichiometrically required to produce a substantial proportion of carbon dioxide, comprising burning the products in a combuster and forming a gaseous feed-stock stream;
    placing the gaseous feedstock stream in heat exchange relation with incoming products thereby vaporizing volatile carbon compounds from the products before entering the combuster;
    delivering the feedstock stream to a plasma arc generator and converting the feedstock stream into a stream of hot atoms;
    cooling the stream of hot atoms to a temperature where the atoms recombine into a molecular stream of carbon monoxide, carbon dioxide, hydrogen and an inert gas;
    converting the molecular stream into a useful product;
    analyzing the material downstream of the plasma generator and determining the amount of oxygen therein; and
    adjusting the oxygen concentration in the molecular stream in response to the concentration of oxygen.

39. A method of converting products containing a sizeable proportion of organic material into carbon monoxide and hydrogen, comprising
    creating a feedstock stream having therein oxygen in a amount sufficient to produce a substantial proportion of carbon monoxide and less than that stoichiometrically required to produce a substantial proportion of carbon dioxide comprising burning the products in a starved air burner and forming a gaseous feedstock stream;
    delivering the feedstock stream to a plasma arc generator and converting the feedstock stream into a stream of hot atoms;
    cooling the stream of hot atoms to a temperature where the atoms recombine into a molecular stream of carbon monoxide, carbon dioxide, hydrogen and an inert gas;
    converting the molecular stream into a useful product;
    analyzing the material downstream of the plasma generator and determining the amount of oxygen therein; and
    adjusting the oxygen concentration in the molecular stream in response to the concentration of oxygen comprising reducing the amount of air delivered to the starved air burner when the carbon dioxide concentration rises above a predetermined value.

40. A method of converting products containing a sizeable proportion of organic material into carbon monoxide and hydrogen, comprising
    creating a feedstock stream having therein oxygen in a amount sufficient to produce a substantial proportion of carbon monoxide and less than that stoichiometrically required to produce a substantial proportion of carbon dioxide comprising burning the products in a starved air burner and forming a gaseous feedstock stream;
    delivering the feedstock stream to a plasma arc generator and converting the feedstock stream into a stream of hot atoms;
    cooling the stream of hot atoms to a temperature where the atoms recombine into a molecular stream of carbon monoxide, carbon dioxide, hydrogen and an inert gas;
    converting the molecular stream into a useful product;

analyzing the material downstream of the plasma generator and determining the amount of oxygen therein; and adjusting the oxygen concentration in the molecular stream in response to the concentration of oxygen comprising increasing the ratio of air to fuel delivered to the starved air burner when the oxygen concentration falls below a predetermined value.

41. A method of converting products containing a sizeable proportion of organic material into carbon monoxide and hydrogen, comprising creating a feedstock stream having therein oxygen in a amount sufficient to produce a substantial proportion of carbon monoxide and less than that stoichiometrically required to produce a substantial proportion of carbon dioxide;

delivering the feedstock stream to a plasma arc generator and converting the feedstock stream into a stream of hot atoms;

cooling the stream of hot atoms to a temperature where the atoms recombine into a molecular stream of carbon monoxide, carbon dioxide, hydrogen and an inert gas;

converting the molecular stream into a useful product;

analyzing the material downstream of the plasma generator and determining the amount of oxygen therein; and adjusting the oxygen concentration in the molecular stream in response to the concentration of oxygen comprising adding $H_2O$ to the stream of hot atoms when the concentration of oxygen falls below a predetermined value.

* * * * *